(12) United States Patent
Rtail et al.

(10) Patent No.: US 10,160,409 B2
(45) Date of Patent: Dec. 25, 2018

(54) ENGINE STOP-START AUXILIARY BATTERY DISCONNECT DETECTION

(71) Applicants: Toufic R Rtail, Dearborn, MI (US); Min Han, Troy, MI (US); Amber Plee, Rochester Hills, MI (US); John J Nahirniak, Warren, MI (US); Michael E List, Grand Blanc, MI (US); Gary A Gonzales, Northville, MI (US); Robert Schropshire, Jr., Troy, MI (US)

(72) Inventors: Toufic R Rtail, Dearborn, MI (US); Min Han, Troy, MI (US); Amber Plee, Rochester Hills, MI (US); John J Nahirniak, Warren, MI (US); Michael E List, Grand Blanc, MI (US); Gary A Gonzales, Northville, MI (US); Robert Schropshire, Jr., Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 178 days.

(21) Appl. No.: 15/404,482

(22) Filed: Jan. 12, 2017

(65) Prior Publication Data

US 2018/0194306 A1 Jul. 12, 2018

(51) Int. Cl.
*B60R 22/00* (2006.01)
*F02P 9/00* (2006.01)
(Continued)

(52) U.S. Cl.
CPC ........ *B60R 16/0234* (2013.01); *F02N 11/084* (2013.01); *F02N 11/0818* (2013.01);
(Continued)

(58) Field of Classification Search
CPC .. F02N 11/0818; F02N 11/14; F02N 11/0825; F02N 11/084; G07C 5/006; B60R 16/0234
See application file for complete search history.

(56) References Cited

U.S. PATENT DOCUMENTS 4,630,577 A * 12/1986 Cornacchia ..... B60W 30/18018
123/179.3
5,859,481 A 1/1999 Banyas
(Continued)

FOREIGN PATENT DOCUMENTS

JP 2004028011 A 1/2004
JP 2010275923 A 12/2010

OTHER PUBLICATIONS

International Search Report and Written Opinion dated Mar. 27, 2018, International Application No. PCT/US2017/061704, Filing Date Nov. 15, 2017.

*Primary Examiner* — Alfonso Perez Borroto
*Assistant Examiner* — Esayas Yeshaw
(74) *Attorney, Agent, or Firm* — Ralph E. Smith

(57) ABSTRACT

A system for controlling an automatic engine stop-start system of a vehicle includes a controller, an engine configured to be automatically stopped and started in response to a signal from the controller, a primary power source electrically coupled to the controller, and an auxiliary power source electrically coupled to the controller. A power control relay is electrically connected between the primary power source and the auxiliary power source and is configured to be selectively activated to isolate the auxiliary power source from the primary power source such that only the auxiliary power source is configured to supply power to the controller. The controller is configured to determine if the auxiliary power source is electrically disconnected from the vehicle when the power control relay is activated.

13 Claims, 3 Drawing Sheets

(51) Int. Cl.
  *H02G 3/00* (2006.01)
  *B60R 16/023* (2006.01)
  *F02N 11/08* (2006.01)
  *G07C 5/00* (2006.01)
  *F02N 11/14* (2006.01)

(52) U.S. Cl.
  CPC .......... *F02N 11/0825* (2013.01); *F02N 11/14* (2013.01); *G07C 5/006* (2013.01)

(56) References Cited

U.S. PATENT DOCUMENTS

| | | | |
|---|---|---|---|
| 6,999,867 B2 | 2/2006 | Konno | |
| 7,098,624 B2 | 8/2006 | Kusaka | |
| 7,966,110 B2 | 6/2011 | Tarchinski | |
| 8,020,650 B2 | 9/2011 | Maanen et al. | |
| 8,054,083 B2 | 11/2011 | Bauer et al. | |
| 2003/0055666 A1* | 3/2003 | Roddy | B61L 27/0094 705/305 |
| 2009/0217897 A1* | 9/2009 | Hartmann | F02N 11/08 123/179.3 |
| 2011/0012424 A1* | 1/2011 | Wortberg | H02J 7/1423 307/10.1 |
| 2011/0213525 A1 | 9/2011 | Kanemoto et al. | |
| 2014/0229090 A1 | 8/2014 | Rademacher et al. | |
| 2015/0275841 A1 | 10/2015 | Sakata et al. | |
| 2017/0093316 A1* | 3/2017 | Toyora | H02P 9/10 |

\* cited by examiner

ENGINE STOP-START AUXILIARY BATTERY DISCONNECT DETECTION

FIELD

The present application relates generally to automatic stop-start engine systems and, more particularly, to a system and method for detecting a disconnected stop-start auxiliary battery for an automatic engine stop-start system.

BACKGROUND

Many newer vehicles are equipped with an automatic stop-start system that automatically shuts down and restarts the vehicle engine to reduce fuel consumption. For example, the vehicle engine may be automatically turned off when the vehicle comes to a stop at a traffic signal, and automatically started when the driver releases the brake pedal. The stop-start systems typically require an auxiliary power source/battery to stabilize voltage during the autostart event. However, if the auxiliary power source/battery is disconnected, the missing auxiliary power source/battery may disrupt power to vehicle modules and prevent the autostart event. Heretofore, it has not been possible to detect an auxiliary power source disconnection without additional hardware. Accordingly, while such conventional stop-start systems work well for their intended purpose, it is desirable to provide an improved automatic stop-start system with auxiliary power source disconnect detection.

SUMMARY

According to one example aspect of the invention, a system for controlling an automatic engine stop-start system of a vehicle is provided. In one exemplary implementation, the system includes a controller, an engine configured to be automatically stopped and started in response to a signal from the controller, a primary power source electrically coupled to the controller, and an auxiliary power source electrically coupled to the controller. A power control relay is electrically connected between the primary power source and the auxiliary power source and is configured to be selectively activated to isolate the auxiliary power source from the primary power source such that only the auxiliary power source is configured to supply power to the controller. The controller is configured to determine if the auxiliary power source is electrically disconnected from the vehicle when the power control relay is activated.

According to another example aspect of the invention, a method of controlling an automatic engine stop-start system of a vehicle having an engine, a controller, a primary power source and an auxiliary power source electrically connected to the controller, and a power control relay electrically connected between the primary and auxiliary power sources, is provided. In one exemplary implementation, the method includes activating the power control relay to isolate the auxiliary power source from the primary power source such that only the auxiliary power source is configured to supply power to the controller, and determining the auxiliary power source is electrically disconnected from the vehicle if the controller loses power when the power control relay is activated.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein are systems and methods for detecting a disconnected auxiliary battery for an automatic stop-start system. In one example implementation, an engine control module (ECM) includes an algorithm to detect an open auxiliary power source condition at key start. If power is missing, the ECM disables subsequent auto stops during the current and future drive cycles until the vehicle is serviced.

Figure 1:
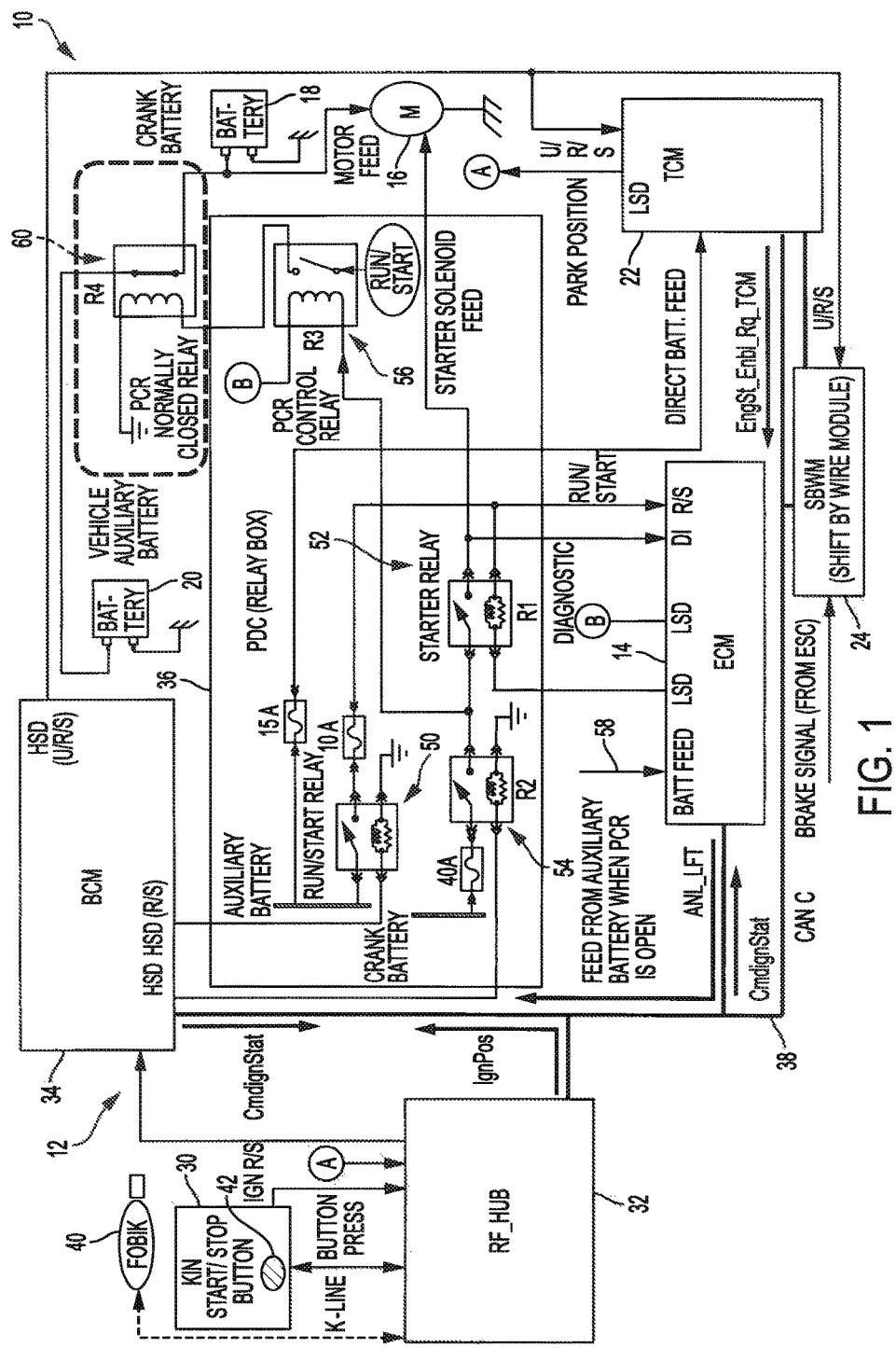
FIG. 1 is a schematic diagram of an example vehicle control system in accordance with the principles of the present disclosure.

With initial reference to FIG. 1, an example schematic diagram of a vehicle control system is illustrated and generally identified at reference numeral 10. The vehicle control system 10 is equipped with an automatic stop-start system configured to automatically shut down and restart a vehicle engine (not shown). In the example embodiment, vehicle control system 10 generally includes an automatic engine stop-start system (ESS) 12, a controller or electronic control module (ECM) 14, a motor feed 16, a primary crank power source or battery 18, an auxiliary power source or battery 20, a transmission control module (TCM) 22, and a shift-by-wire module (SBWM) 24.

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the illustrated embodiment, automatic engine stop-start system 12 generally includes a keyless ignition (KIN) 30, a radio frequency hub (RF HUB) 32, a second controller or body control module (BCM) 34, and a power distribution center (PDC) 36. In alternative embodiments, KIN 30 and RF HUB 32 may be replaced by a keyed ignition. RF HUB 32 and BCM 34 are in signal communication with ECM 14 via a CAN C communication bus 38.

A key fob 40 may be associated with RF HUB 32 to enable the vehicle to be started, and KIN 30 may include a start/stop button 42 in signal communication with RF HUB 32, which is configured to send an ignition run/start signal to BCM 34. As shown, BCM 34 is in signal/electrical communication with ECM 14, TCM 22, SBWM 24, and PDC 36.

In the example embodiment, PDC 36 generally includes an auxiliary battery run/start relay 50, a first starter relay 52, a second starter relay 54, and a first power control relay (PCR) 56. Auxiliary battery run/start relay 50 is electrically coupled to BCM 34, first starter relay 52 is electrically coupled to ECM 14, and second starter relay 54 and first PCR 56 are electrically coupled to BCM 34.

Primary crank battery 18 and auxiliary battery 20 are electrically coupled to ECM 14 via a battery feed 58. Auxiliary battery 20 is utilized in addition to primary crank battery 18 to stabilize voltage during an autostart event of the ESS system 12. However, if auxiliary battery 20 is electrically disconnected from system 10, it may be unable to prevent power disruptions that can potentially prevent completion of crank and engine restart during an autostart event. Such electrical disconnection may occur due to improper connecting during assembly, damage from animals/environment, or forgetting to reconnect after servicing of the auxiliary battery.

Accordingly, to enable detection of a disconnected auxiliary batter 20, a second PCR 60 is disposed between primary crank battery 18 and auxiliary battery 20 to selectively isolate the auxiliary battery 20 from the primary crank battery 18 during engine start. Further, ECM 14 includes an algorithm or control software that enables vehicle control system 10 to detect if auxiliary battery 20 is electrically disconnected from system 10, as described herein in more detail. Upon detecting a disconnected auxiliary battery, vehicle control system 10 can provide a warning message to the driver to service the vehicle and subsequently disable the automatic engine stop-start function until the vehicle is serviced.

In this way, ECM 14 employs the algorithm to detect a disconnected auxiliary battery 20 by detecting an open auxiliary battery condition at each key start and, if power is missing, disabling subsequent auto stop events during the current and future drive cycles until the vehicle is serviced. More specifically, at keystart before crank is initiated, ECM 14 writes a flag to an EEPROM or flash memory and then opens the second PCR 60 for a predetermined time sufficient to isolate auxiliary battery 20 such that primary crank battery 18 is not supplying power to ECM 14.

If auxiliary battery 20 is in fact disconnected from the circuit, ECM 14 will not receive power from either primary crank battery 18 or auxiliary battery 20, thereby causing ECM 14 to shut down. After a predetermined time, second PCR 60 closes, thereby enabling primary crank battery 18 to again supply power to ECM 14. Upon restart, ECM 14 will restart the algorithm and set a diagnostic trouble code (DTC) upon detection of the flag previously written to the EEPROM. The ECM 14 will then bypass further checks for disconnected auxiliary battery 20 during the current drive cycle and subsequent key cycles until the vehicle is serviced. Additionally, in response to the detected disconnected auxiliary battery 20, ECM 14 may enable a warning message (e.g., text, symbol, light, etc.), disable automatic engine stop-start function, and then clear the flag. The detection algorithm may be subsequently enabled again after clearing the DTC by a service tool or by completely disconnecting power to ECM 14.

If auxiliary battery 20 is determined to be connected to the circuit, the crank event proceeds as normal after predetermined lapse of time, and automatic engine stop-start is permitted. ECM 14 subsequently clears the flag in preparation for the next key cycle test to determine if auxiliary battery 20 is disconnected. As such, the flag is cleared in the event of a key cycle to prevent a false determination of a disconnected or missing auxiliary battery 20 due to the driver interrupting the start sequence.

Figure 2A:
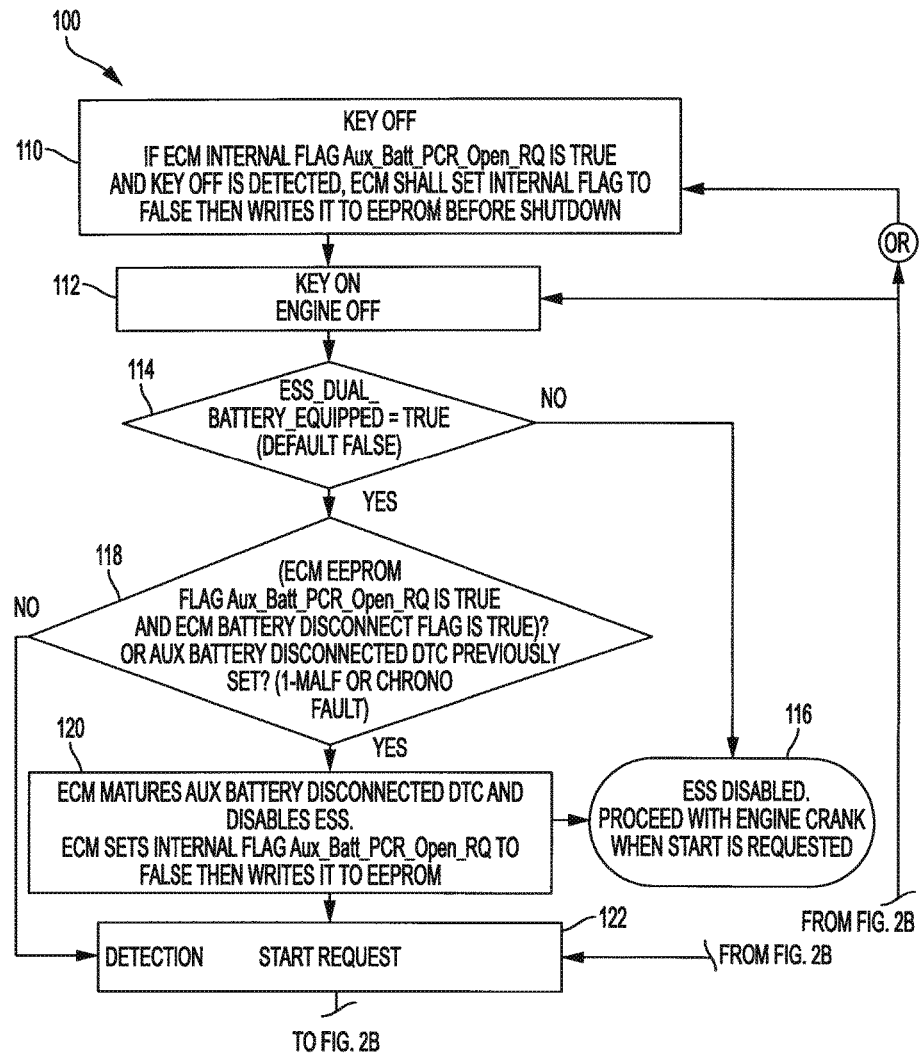
FIGS. 2A and 2B are a flow diagram of an example control of the vehicle control system shown in FIG. 1, in accordance with the principles of the present disclosure.
Figure 2B:
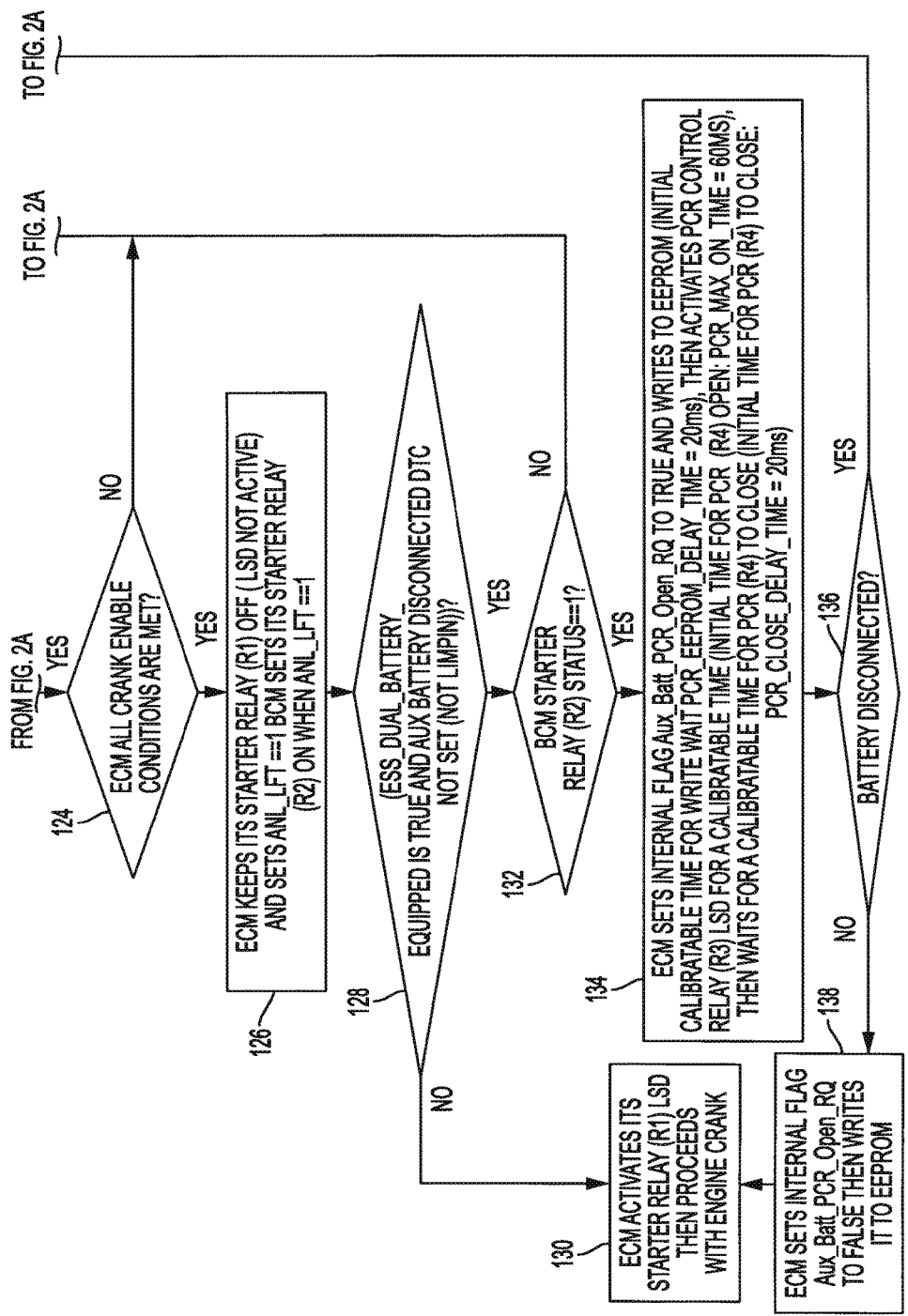

FIGS. 2A and 2B illustrate one example control method 100 utilizing the ECM 14 and associated algorithm to control the vehicle automatic stop-start system, and to determine if auxiliary battery 20 is electrically disconnected from vehicle control system 10. More specifically, at step 110, a signal is received to shut the vehicle engine off. If ECM 14 indicates an internal flag Aux-Batt-PCR_Open_RQ is true and a key off is detected, ECM 14 sets the internal flag to false and then writes the flag to EEPROM before vehicle or engine shutdown. In the example embodiment, internal flag Aux-Batt-PCR_Open_RQ is a flag indicating the status of a request to open or activate the second PCR 60, and key off indicates system 10 has received a command to turn off the vehicle or engine.

At step 112, system 10 receives a command to start the vehicle. For example, a driver may press start/stop button 42 of KIN 30. At step 114, ECM 14 determines if the vehicle is equipped with dual batteries (i.e., primary crank battery 18 and auxiliary battery 20). If no, control proceeds to step 116 where automatic engine stop-start function is disabled for system 10, and system 10 proceeds with engine crank when engine start is requested. If the vehicle is equipped with dual batteries, proceeds to step 118.

At step 118, ECM 14 determines if any flags/faults have already been set indicating that auxiliary battery 20 is disconnected. For example, ECM 14 determines if ECM EEPROM flag Aux-Batt-PCR_Open_RQ is true and if an ECM battery disconnect flag is true. Alternatively, ECM 14 determines if a DTC was previously set indicating that auxiliary battery 20 is disconnected.

If either condition is true, control proceeds to step 120 and the ECM 14 sets a DTC indicating the auxiliary battery is disconnected (if such a DTC does not already exist), and subsequently disables automatic engine stop-start operation. Alternatively or additionally, ECM 14 may set the internal flag Aux-Batt-PCR_Open_RQ to false and write it to the EEPROM. This prevents ECM 14 from opening the second PCR 60 to check if auxiliary battery 20 is disconnected (until the vehicle is serviced and the DTC is cleared) since a disconnected auxiliary battery 20 has already been confirmed. Additionally, system 10 may enable a warning message alerting the driver to service the vehicle due to the disconnected auxiliary battery 20. Control then proceeds to step 116 where the automatic engine stop-start function is disabled for system 10, and system 10 proceeds with engine crank when engine start is requested.

If either condition is false at step 118, control proceeds to step 122 where ECM 14 receives a request to start the vehicle. For example, a driver may press the vehicle brake and the start/stop button 42, which sends a signal indicative of the start request via RF HUB 32 and BCM 34. At step 124, ECM 14 determines if one or more predetermined conditions are met to enable engine crank. For example, one predetermined condition is the vehicle being in Park or Neutral. If the predetermined condition(s) are not met, control returns to step 122. If the predetermined condition(s) are met, control proceeds to step 126.

At step 126, ECM 14 keeps starter relay 52 off and sends a signal ANL_LFT==1, which causes BCM 34 to close starter relay 54. At step 128, ECM 14 determines if the vehicle is equipped with dual batteries (i.e., batteries 18, 20) and if the DTC indicating a disconnected auxiliary battery is not set. If dual batteries are not equipped or the DTC is set, control proceeds to step 130 where ECM 14 activates starter relay 52 and proceeds with engine crank. If dual batteries are equipped and the DTC is not set, control proceeds to step 132.

At step 132, ECM 14 determines whether it has received a status signal (status report) from BCM 34 indicating that starter relay 54 is activated. If the starter relay 54 is not activated, control returns to step 122. If the signal indicates starter relay 54 is activated, control proceeds to step 134.

At step 134, ECM 14 requests opening of the second PCR 60 to determine if auxiliary battery 20 is electrically disconnected from the vehicle. More specifically, ECM 14 sets an internal flag to request opening of the second PCR 60 and writes the flag to EEPROM. ECM 14 then waits a predetermined amount of time (e.g., 20 ms or approximately 20 ms), and subsequently activates first PCR 56 for a predetermined amount of time (e.g., 60 ms or approximately 60 ms). This causes second PCR 60 to open and isolate auxiliary battery 20 from primary battery 10. ECM 14 then waits a predetermined amount of time for second PCR 60 to close.

At step 136, ECM 14 determines if auxiliary battery 20 is disconnected based on the outcome of the steps performed in step 134. If auxiliary battery 20 is electrically connected to the vehicle, it will continue to provide power to ECM 14 even though PCR 60 is open and auxiliary battery 20 is isolated. Thus, because ECM 14 does not lose power, ECM 14 determines that auxiliary battery 20 is connected to system 10 since auxiliary battery 20 is the only power source feeding ECM 14 when second PCR 60 is open (primary crank battery 18 is disconnected). Accordingly, if auxiliary battery 20 is determined to be connected, control proceeds to step 138 where ECM 14 sets the internal flag Aux-Batt-PCR_Open_RQ to false and writes the flag to EEPROM. Control then proceeds to step 130 where ECM 14 activates starter relay 52 and proceeds with engine crank.

However, if auxiliary battery 20 is electrically disconnected and not supplying power, ECM 14 will thus lose power when PCR 60 is open and primary crank battery 18 is electrically disconnected from ECM 14. When PCR 60 closes after the predetermined time, power will be restored to ECM 14 via primary battery 18. Upon restart, ECM 14 determines it had lost power, sets a flag indicating the auxiliary battery is disconnected (ECM Battery Disconnect Flag), and checks the flag Aux_Batt_PCR_RQ in EEPROM. Upon detection of the battery disconnect flag, system 10 sets the DTC indicating the auxiliary battery is disconnected. Accordingly, if auxiliary battery 20 is determined to be disconnected, the described control is performed, and then the control returns to either step 110 or step 112.

Described herein are system and methods for detecting a disconnected auxiliary battery in a vehicle equipped with an automatic engine stop-start system. The system includes an ECM configured to, upon keystart and before engine crank, open a power control relay for a time sufficient to isolate the auxiliary battery from the primary battery. If the auxiliary battery is disconnected, the ECM will lose power, thereby causing the ECM to detect a previously set flag. The ECM will subsequently set a fault code, bypass further disconnection checks in that drive cycles and subsequent key cycles, enable a warning message, and disable automatic engine stop-start function. As such, the ECM is configured to detect a disconnected auxiliary battery for an automatic engine stop-start system utilizing only additional control software without the incurred cost of new hardware and/or sensors.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

ACRONYMS AND VARIABLE NAMES

ANL_LFT: ECM request to BCM to turn on its Starter
BCM: Body Control Module
CAN C: Communication bus
DTC: Diagnostic Trouble Code
ECM: Engine Control Module
ESS: Engine Stop-Start
FOBIK: Key FOB
HSD: High Side Driver
IGN/RS: Ignition Run/Start
KIN: Keyless Ignition Node
K-Line: Communication bus
LSD: Low Side Driver
PCR: Power Control Relay
PDC: Power Distribution Center
RF_HUB: Radio Frequency Hub (Ignition Module)
SBWM: Shifter Module
TCM: Transmission Control Module
U/R/S: Ignition Unlock/Run/Start

What is claimed is:

1. A system for controlling an automatic engine stop-start system of a vehicle, comprising:
a controller;
an engine configured to be automatically stopped and started in response to a signal from the controller;
a primary power source electrically coupled to the controller;
an auxiliary power source electrically coupled to the controller; and
a power control relay electrically connected between the primary power source and the auxiliary power source, the power control relay configured to be selectively activated to isolate the auxiliary power source from the primary power source such that only the auxiliary power source is configured to supply power to the controller;
wherein the controller is configured to determine if the auxiliary power source is electrically disconnected from the vehicle when the power control relay is activated, and when the controller determines the auxiliary power source is electrically disconnected from the vehicle, disable the automatic engine stop-start system such that the vehicle is prevented from an automatic engine stop-start function.

2. The system of claim 1, wherein the controller determines the auxiliary power source is electrically disconnected from the vehicle if the controller loses power when the power control relay is activated.

3. The system of claim 1, wherein the controller is configured to set a power source disconnect flag when it is determined that the auxiliary power source is electrically disconnected from the vehicle.

4. The system of claim 3, wherein the controller is configured to set a fault code upon detecting the power source disconnect flag.

5. The system of claim 4, wherein when the controller determines the auxiliary power source is electrically disconnected from the vehicle, the controller is configured to disable the automatic engine stop-start system during a current key start and during future key starts until the vehicle is serviced and the fault code is cleared.

6. The system of claim 1, wherein the primary power source is a primary crank battery, and wherein the auxiliary power source is an auxiliary battery.

7. The system of claim 1, wherein activating the power control relay comprises opening the power control relay.

8. A method of controlling an automatic engine stop-start system of a vehicle having an engine, a controller, a primary power source and an auxiliary power source electrically connected to the controller, and a power control relay electrically connected between the primary and auxiliary power sources, the method comprising:

activating the power control relay to isolate the auxiliary power source from the primary power source such that only the auxiliary power source is configured to supply power to the controller;

determining the auxiliary power source is electrically disconnected from the vehicle if the controller loses power when the power control relay is activated; and disabling the automatic engine stop-start system when it is determined the auxiliary power source is electrically disconnected from the vehicle.

9. The method of claim 8, further comprising setting a fault code in response to detecting the auxiliary power source disconnect flag.

10. The method of claim 9, further comprising disabling the automatic engine stop-start system during a current key start and future key starts until the vehicle is serviced and the fault code is cleared.

11. The method of claim 9, further comprising setting an auxiliary power source disconnect flag when it is determined the auxiliary power source is electrically disconnected from the vehicle.

12. The method of claim 8, wherein activating the power control relay comprises opening the power control relay.

13. The method of claim 8, further comprising:

receiving a key on request;

determining if a first flag and a second flag are present, the first flag indicating a request to activate the power control relay, and the second flag indicating the auxiliary power source is electrically disconnected from the vehicle;

determining if a fault code was previously set indicating the auxiliary power source is electrically disconnected from the vehicle;

disabling the automatic engine stop-start system if the first and second flags are present or the fault code was previously set;

receiving a request to start the vehicle;

activating a second starter relay without activating a first starter relay, the first and second starter relays being part of a power distribution center;

wherein disabling the automatic engine stop-start system when it is determined the auxiliary power source is electrically disconnected from the vehicle includes disabling the automatic engine stop-start system and resetting the second flag and setting the fault code when it is determined the auxiliary power source is electrically disconnected from the vehicle; and activating the first starter relay to start the engine if the auxiliary power source is not determined to be electrically disconnected from the vehicle.

* * * * *